Nov. 10, 1959     R. LUDDECKE     2,912,144
AUTOMATICALLY CLOSABLE VALVE FOR A CONTAINER
HAVING A FLUID UNDER PRESSURE THEREIN
Filed Sept. 20, 1956

INVENTOR.
Rudi Lüddecke
BY Michael S. Striker
agt

United States Patent Office 2,912,144
Patented Nov. 10, 1959

2,912,144

AUTOMATICALLY CLOSABLE VALVE FOR A CONTAINER HAVING A FLUID UNDER PRESSURE THEREIN

Rudi Luddecke, Braunschweig, Germany

Application September 20, 1956, Serial No. 611,021

7 Claims. (Cl. 222—394)

The present invention relates to valves.

More particularly, the present invention relates to automatically closable valves of the type which are adapted to be used on containers in which fluids under pressure are located so that the operator can actuate the valve to release fluid from the container, and when the operator releases the valve it automatically closes. For example, such valves are used for containers which have whipped cream under pressure therein or which have shaving cream under pressure therein, and the like.

Known valves of this type are rather expensive to manufacture and assemble because of the relatively large number of parts required with the conventional valve of this type, the large number of parts being required not only to mount the valve for movement between its open and closed positions in such a way that the valve can automatically be returned to its closed position, but also to guarantee that the discharge tube of such valves does not shift axially. Furthermore, the valve must be so constructed that after the fluid which is to be dispensed from the container is located therein, and the valve is then placed on the container, a gas under pressure must be capable of being introduced into the container through the valve, and the introduction of a gas under pressure through the valve into the container at the present time requires a fairly complex structure and requires a relatively large number of manual operations.

One of the objects of the present invention is to provide a valve of the above type which is composed of an extremely small number of parts which are of a relatively simple construction and which are relatively easy to assemble.

Another object of the present invention is to provide a valve of the above type which, in spite of the simplicity of its construction and the small number of parts, nevertheless is very reliable in operation and reliably maintains the discharge tube of the valve in a predetermined axial position with respect to the remainder of the valve structure so that slow leakage of the gas under pressure in the container to the exterior thereof while the valve is in its closed position cannot occur. Such an undesirable occurrence is fairly common with conventional valves of this type.

A further object of the present invention is to provide a valve of the above type which is capable of directing a gas under pressure into the interior of a container which carries the valve simply by connecting the discharge tube of the valve of the invention to a conduit which directs gas under pressure into the discharge tube, so that the introduction of gas under pressure into the container can be carried out in an extremely simple and efficient manner requiring a minimum number of manual operations.

With the above objects in view the present invention mainly consists of an automatically closable valve for controlling the flow of a fluid from a container in which the fluid is located under pressure, this valve including a body of elastic, inherently resilient material adapted to be carried by the container and being formed with a bore passing therethrough and having an inner end adapted to be directed toward the interior of the container when the body is mounted thereon, this body having at its inner end of its bore a resilient, annular lip of a given diameter when the body is unstressed. An elongated tubular discharge member extends from the exterior of the body into and along the bore thereof toward the inner end of the bore, this discharge member being engaged and carried by the body in its bore and the discharge member having a closed end adjacent the inner end of the bore and an open end opposite from the closed end of the discharge member. This closed end of the discharge member has a diameter greater than that of the lip of the body when the latter is unstressed so that this lip resiliently grips the closed end of the discharge member, and the discharge member is formed adjacent its closed end and adjacent the lip between the latter and the open end of the discharge member with a cutout located in the bore of the elastic body and extending from the exterior of the discharge member to the interior thereof, so that when the discharge member is tilted with respect to the body a gap is formed between the lip of the body and the discharge member so that the fluid under pressure flows through this gap to the cutout of the discharge member and through the cutout to the interior of the discharge member. The elastic body due to its inherent resiliency returns the discharge member automatically to a rest position where the lip grips the closed end of the discharge member to close the above-mentioned gap and to prevent further escape of fluid from the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
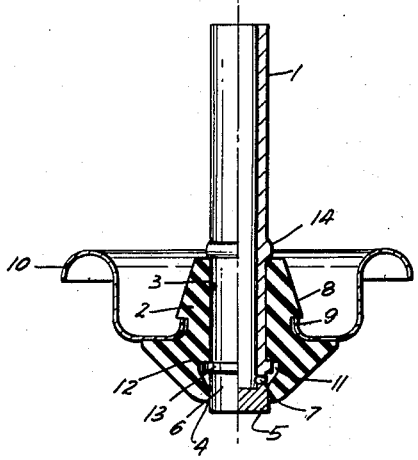
Fig. 1 is a sectional elevational view of one embodiment of a valve according to the present invention shown in association with a diagrammatically illustrated part of a container, the valve being shown in its closed position in Fig. 1.
Figure 2:
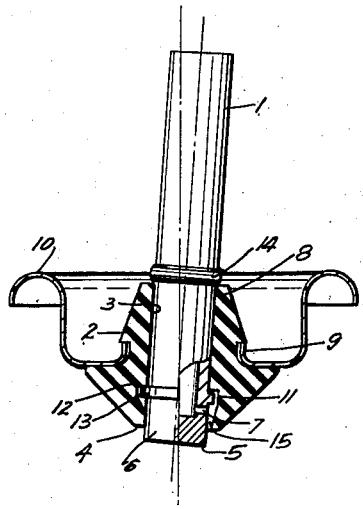
Fig. 2 shows the valve of Fig. 1 in its open position.

Referring now to the drawings and to Figs. 1 and 2 in particular, the valve structure illustrated therein includes a body 2 made of an elastic, inherently resilient material such as rubber, for example. The body 2 is formed with an elongated bore 3 passing therethrough, and the bottom inner end of the bore 3, as viewed in Figs. 1 and 2, is directed toward the interior of the container when the latter carries the body 2, part of this container being shown at 10 in Figs. 1 and 2. An elongated tubular discharge member 1 made of a rigid material extends from the exterior of the body 2 along the interior of the bore 3 thereof toward the bottom inner end of the bore 3, the discharge member 1 being tightly gripped by the body 2 in the bore 3 thereof.

At the inner end of the bore 3, the body 2 is provided with an annular resilient lip 4 which has a diameter smaller than the diameter of the bottom end of the discharge member 1, as viewed in the drawings, when the lip 4 is unstressed. Thus, when the discharge member 1 is assembled with the body 2 in the manner shown in Fig. 1, the lip 4 resiliently grips the outer surface of the discharge member 1 adjacent its bottom end, as viewed in the drawings. It will be noted that this bottom end of the discharge member 1 is provided with an end wall 5 so that the bottom end of the dischrge member 1 is closed, and the top end opposite from the wall 5 of the discharge member 1 is open. Thus, the discharge member 1 has a closed end directed toward the interior of the container.

The upper outer portion of the elastic body 2 is of a frustoconical configuration, as indicated at 8, and it will be noted that the largest diameter of the portion 8 of the body 2 is located nearest to the lip 4. Just beneath the frustoconical portion 8 of the body 2, the latter is formed with an annular groove 9 into which a part of the container 10 extends, in the manner shown diagrammatically in the drawings, so that in this way the body 2 is mounted upon the container 10. The part of the container 10 which extends into the groove 9 defines an opening of the container which is thus closed by the valve structure of the invention.

The size and shape of the elastic body 2 which carries the discharge member 1 as well as the pressure of the gas within the container 10 guarantees that when the valve is released by the operator after being in the open position illustrated in Fig. 2, the resiliency of the body 2 as well as the action of the pressure within the container reliably returns the structure automatically from the position of Fig. 2 to that of Fig. 1 where flow of fluid from the interior of the container 10 is reliably prevented.

Just above the end wall 5, the discharge tube 1 has a portion 6 located just above the lip 4 and formed with a cutout 7 which may be a single small bore, this cutout 7 extending from the exterior of the discharge member 1 to the interior thereof. Instead of a single bore 7, a plurality of such bores may be provided and distributed about the axis of the tube 1, or a single arcuate cutout may be provided.

Just above the lip 4, the body 2 is formed in the bore 3 thereof with an annular groove which forms a hollow annular chamber 11, and this groove forms at its upper annular periphery a shoulder 12 which is directed downwardly toward the lip 4. The discharge tube 1, which may be cylindrical, is provided with an annular projection or bead 13 which engages the shoulder 12 so that upward movement of the tube 1 with respect to the body 2 is prevented in this way. The tube 1 is provided with another annular projection or bead 14 located just outside of the bore 3 at the top end thereof and engaging the top face of the body 2, so that the shoulder 14 cooperates with the body 2 to prevent downward axial movement of the tube 1 with respect to the body 2. Thus, the annular projections 13 and 14 cooperate with annular surfaces of the body 2 to maintain the discharge tube 1 in a predetermined axial position with respect to the body 2.

In the rest or closed position of the valve, which is illustrated in Fig. 1, the discharge tube 1 extends in a vertical direction and the bore 7 is located in the chamber 11 which is closed off from the interior of the container in a fluid-tight manner by the lip 4. It will be noted that the pressure of the gas in the container contributes to the maintenance of the lip 4 against the outer face of the discharge tube 1 in a fluid-tight manner. If the operator laterally moves the discharge tube 1 with respect to the body 2 so that the valve now has the position indicated in Fig. 2, a gap 15 is formed between the discharge tube 1 adjacent its closed end and the lip 4 of the body 2 so that the fluid within the container can now flow through this gap into the chamber 11 and from the latter through the bore 7 and into and along the interior of the discharge tube 1 to the exterior of the container. When the operator releases the discharge tube 1, the body 2 by its own inherent resiliency automatically moves the tube 1 back to its rest position indicated in Fig. 1. Thus, in this latter position, the lip 4 again closes the interior of the tube 1 from the interior of the container in a fluid-tight manner by the resiliency of the lip 4 as well as by the pressure of the gas within the container, and thus the valve is reliably closed.

Figure 3:
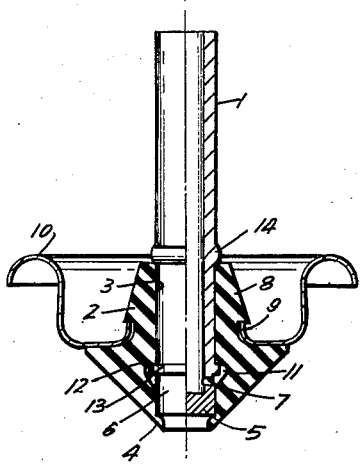
Fig. 3 is a sectional elevational view of another embodiment of a valve according to the present invention shown in Fig. 3 with a diagrammatically illustrated part of a container which carries the valve.
Figure 4:
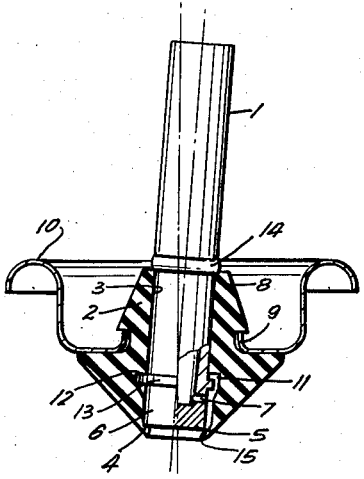
Fig. 4 shows the valve of Fig. 3 in its open position.

It will be noted that with the embodiment of Figs. 1 and 2 the closed end 5 of the discharge member 1 extends slightly beyond the lip 4. With the embodiment of the invention which is shown in Figs. 3 and 4, the valve structure is identical with that of Figs. 1 and 2, except that with the embodiment of Figs. 3 and 4 the lip 4 extends slightly beyond the closed end of the discharge tube 1. Thus, with this embodiment of the invention the lip 4 engages not only the outer side face of the discharge tube 1, but also a part of its end face. Except for this difference, the construction of Figs. 3 and 4 is identical with that of Figs. 1 and 2, and Fig. 4 shows the valve in its open position, while Fig. 3 shows the valve in its closed position.

The rigid discharge tube 1 may, advantageously, be made of a synthetic resin which is either pressed or die cast, although it could also be made of a particular metal particularly suited for the properties of the material which is to be dispensed. Furthermore, instead of being cylindrical, the discharge tube can be somewhat conical in configuration.

It is thus apparent that the valve of the invention includes only two parts, namely, the resilient body 2 and the discharge tube 1, so that the structure is extremely simple to manufacture and assemble and is very reliable in operation.

The provision of a single relatively small bore 7, as shown in the drawings, is of particular significance when it is desired to provide a valve which will reliably prevent the discharge of an undesirably large amount of fluid. With the structure shown in the drawings an undesirably large amount of fluid cannot automatically discharge from the container because of the single relatively small bore 7. Because of the relatively great leverage provided by the length of the discharge tube 1, the valve of the invention is capable of being operated by the application of an extremely small pressure, so that the user can open the valve with the greatest of ease.

When it is desired to introduce a gas under pressure into the container, it is only necessary with the structure of the invention to connect a conduit in a fluid-tight manner to the open end of the discharge tube 1. Then the gas under pressure can simply flow along the interior of the tube 1, through the bore 7, and will automatically raise at least a part of the lip 4 away from the tube 1 so that this gas under pressure can flow very easily into the interior of the container as long as the pressure of the gas entering into the container is greater than the pressure of the gas already within the container. In the reverse direction, it will be noted that the lip 4 engages the tube 1 in a fluid-tight manner to reliably close the discharge from the interior of the container, so that with the structure of the invention a gas under pressure can be easily and quickly introduced into the container and reliably maintained therein until such time as the final user desires to discharge fluid from the interior of the container.

It will be understood that each of the elements described above, or two or more together, may also find a useful application in other types of valves differing from the types described above.

While the invention has been illustrated and described as embodied in automatically closable valves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An automatically closable valve for controlling the flow of fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate annular portion and said inner end thereof an inner end portion tapered toward said inner end and ending in a resilient, annular, tapered lip of a given diameter when said body is unstressed; and an elongated tubular discharge member extending from the exterior of said body into and along said bore thereof toward said inner end of said bore, said discharge member being engaged and carried by said body in said bore thereof and said discharge member having an open top end and a bottom closed end, said closed end of said discharge member having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adjacent said lip between the latter and said open end of said discharge member with a cutout located in said bore and extending from the exterior of said discharge member to the interior thereof, the outer tapered surface of said inner end portion including said lip being free and unengaged so that said inner end portion and said lip are freely tiltable with respect to the remainder of said body, whereby when said discharge member is tilted with respect to said body a gap is formed between said lip and discharge member through which fluid under pressure flows to said cutout and through the latter to the interior of said discharge member, said body due to its inherent resiliency returning said discharge member automatically to a rest position where said lip grips said closed end of said discharge member to close said gap and prevent further escape of fluid.

2. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon and an outer free annular end face adapted to be located outside the container, said body having between said intermediate annular portion and said inner end thereof an inner end portion tapered toward said inner end and ending in a resilient, annular, tapered lip of a given diameter when said body is unstressed, and said body having between said outer free annular end face and said intermediate portion an outer end portion of frusto-conical configuration having its largest diameter located nearest to said intermediate annular portion of said body; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adjacent said lip between the latter and said open end of said discharge member with a cutout located in said bore and extending from the exterior of said discharge member to the interior thereof, the outer tapered surface of said inner end portion including said lip being free and unengaged so that said inner end portion and said lip are freely tiltable with respect to the remainder of said body, whereby when said discharge member is tilted with respect to said body a gap is formed between said lip and discharge member through which fluid under pressure flows to said cutout and through the latter to the interior of said discharge member, said body due to its inherent resiliency returning said discharge member automatically to a rest position where said lip grips said closed end of said discharge member to close said gap and prevent further escape of fluid, said discharge member having an annular projection engaging said outer end face of said body and forming a pivoting abutment for said discharge member.

3. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate portion and said inner end thereof an inner end portion tapered toward said inner end and ending in a resilient, annular, tapered lip of a given diameter when said body is unstressed, and said body being formed in said bore thereof next to said lip with an annular groove forming a hollow annular chamber in said body adjacent said lip; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adjacent said lip between the latter and said open end of said discharge member with a cutout located in said chamber and extending from the exterior of said discharge member to the interior thereof, the outer tapered surface of said inner end portion including said lip being free and unengaged so that said inner end portion and said lip are freely tiltable with respect to the remainder of said body, whereby when said discharge member is tilted with respect to said body a gap is formed between said lip and discharge member through which fluid under pressure flows to said chamber and cutout and through the latter to the interior of said discharge member, said body due to its inherent resiliency returning said discharge member automatically to a rest position where said lip grips said closed end of said discharge member to close said gap and prevent further escape of fluid.

4. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate annular portion and said inner end thereof an inner end portion tapered toward said inner end and ending in a resilient annular tapered lip of a given diameter when said body is unstressed, and said body being formed in said bore thereof next to said lip with an annular groove forming a hollow annular chamber in said body adjacent said lip; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adjacent said lip between the latter and said open end of said discharge member with a cutout located in said chamber and extending from the exterior of said discharge member to the interior thereof, the outer tapered surface of said inner end portion including said lip being free and unengaged so that said inner end portion and said lip are freely tiltable with respect to the remainder of said body, whereby when said discharge member is tilted with respect to said body a gap is formed between said lip and discharge member through which fluid under pressure flows to said chamber and cutout and through the latter to the interior of said discharge member, said body due to its inherent resiliency returning said discharge member automatically to a rest position where said lip grips said closed end of said discharge member to close said gap and prevent further escape of fluid, said groove which forms said chamber forming at its periphery distant from said lip a shoulder in the interior of said bore which is directed toward said lip, and said discharge member having in said chamber an annular projection which engages said shoulder.

5. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate annular portion and said inner end thereof an inner end portion tapered toward said inner end and ending in a resilient, annular, tapered lip of a given diameter when said body is unstressed, and said body being formed in said bore thereof next to said lip with an annular groove forming a hollow annular chamber in said body adjacent said lip; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adacent said lijp between the latter and said open end of said discharge member with a cutout located in said chamber and extending from the exterior of said discharge member to the interior thereof, the outer tapered surface of said inner end portion including said lip being free and unengaged so that said inner end portion and said lips are freely tiltable with respect to the remainder of said body, whereby when said discharge member is tilted with respect to said body a gap is formed between said lip and discharge member through which fluid under pressure flows to said chamber and cutout and through the latter to the interior of said discharge member, said body due to its inherent resiliency returning said discharge member automatically to a rest position where said lip grips said closed end of said discharge member to close said gap and prevent further escape of fluid, said groove which forms said chamber forming at its periphery distant from said lip a shoulder in the interior of said bore which is directed toward said lip, and said discharge member having in said chamber an annular projection which engages said shoulder, and said discharge member having a second annular projection located just outside of said bore and engaging the end of said body distant from said inner end thereof and forming a pivoting abutment for said discharge member.

6. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate annular portion and said inner end thereof an inner end portion tapered toward said inner end and ending in a resilient annular tapered lip of a given diameter when said body is unstressed; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member extending beyond said lip and having a diameter greater than that of said lip when the latter is unstressed and said lip resiliently gripping said closed end of said discharge member in radial direction, said lip being inclined toward the bottom end of said discharge member, and said discharge member being formed adjacent said closed end thereof and adjacent said lip between the latter and said open end of said discharge member with a cutout located in said bore and extending from the exterior of said discharge member to the interior thereof, the outer tapered surface of said inner end portion including said lip being free and unengaged so that said inner end portion and said lip are rfeely tiltable with respect to the remainder of said body, whereby when said discharge member is tilted with respect to said body a gap is formed between said lip and discharge member through which fluid under pressure flows to said cutout and through the latter to the interior of said discharge member, said body due to its inherent resiliency returning said discharge member automatically to a rest position where said lip grips said closed end of said discharge member to close said gap and prevent further escape of fluid.

7. An automatically closable valve for controlling the flow of a fluid from a container in which the fluid is located under pressure, comprising, in combination, a body of elastic, inherently resilient material adapted to be carried by the container and being formed with a bore passing therethrough and having an inner end adapted to be directed toward the interior of the container when said body is mounted thereon, said body having between said intermediate annular portion and said inner end thereof an inner end portion tapered toward said inner end and ending in a resilient, annular, tapered lip of a given diameter when said body is unstressed; and an elongated tubular discharge member extending from the exterior of said body into and along said bore thereof toward said inner end of said bore, said discharge member being engaged and carried by said body in said bore thereof and said discharge member having a closed end adjacent said inner end of said bore and an open end opposite from said closed end, said closed end of said discharge member having a diameter greater than that of said lip when the latter is unstressed and said lip resiliently gripping said closed end of said discharge member in radial direction, said lip extending slightly beyond said closed end of said discharge member and said discharge member being formed adjacent said closed end thereof and adjacent said lip between the latter and said open end of said discharge member with a cutout located in said bore and extending from the exterior of said discharge member to the interior thereof, the outer tapered surface of said inner end portion including said lip being free and unengaged so that said inner end portion and said lip are freely tiltable with respect to the remainder of said body, whereby when said discharge member is tilted with respect to said body a gap is formed between said lip and discharge member through which fluid under pressure flows to said cutout and through the latter to the interior of said discharge member, said body due to its inherent resiliency returning said discharge member automatically to a rest position where said lip grips said closed end of said discharge member to close said gap and prevent further escape of fluid.

References Cited in the file of this patent

UNITED STATES PATENTS

| | | |
|---|---|---|
| 2,621,014 | Efford | Dec. 9, 1952 |
| 2,704,172 | Lapin | Mar. 15, 1955 |
| 2,750,230 | Soffer et al. | June 12, 1956 |
| 2,763,406 | Countryman | Sept. 18, 1956 |
| 2,767,023 | Venus | Oct. 16, 1956 |